(12) United States Patent
Lux et al.

(10) Patent No.: US 11,293,826 B2
(45) Date of Patent: Apr. 5, 2022

(54) METHOD FOR PRODUCING A DEVICE FOR DETECTING AT LEAST ONE PROPERTY OF A FLUID MEDIUM IN A MEASURING CHAMBER

(71) Applicant: Robert Bosch GmbH, Stuttgart (DE)

(72) Inventors: Alexander Lux, Tambach-Dietharz (DE); Andreas Otto, Hoerselberg-Hainich (DE); Andreas Roehler, Eisenach (DE); Jens Vollert, Muehlhausen (DE); Markus Reinhard, Andernach (DE); Patrik Patzner, Leonberg (DE); Ronny Wolf, Eisenach (DE); Vincent Barnstorff, Eisenach (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 15/780,006

(22) PCT Filed: Oct. 17, 2016

(86) PCT No.: PCT/EP2016/074896
§ 371 (c)(1),
(2) Date: May 30, 2018

(87) PCT Pub. No.: WO2017/092921
PCT Pub. Date: Jun. 8, 2017

(65) Prior Publication Data
US 2018/0372574 A1    Dec. 27, 2018

(30) Foreign Application Priority Data
Dec. 1, 2015    (DE) .......................... 102015223850.4

(51) Int. Cl.
*G01L 19/14*    (2006.01)
*G01L 19/00*    (2006.01)
*G01L 19/06*    (2006.01)

(52) U.S. Cl.
CPC ........ *G01L 19/143* (2013.01); *G01L 19/0061* (2013.01); *G01L 19/146* (2013.01); *G01L 19/148* (2013.01); *G01L 19/0627* (2013.01)

(58) Field of Classification Search
CPC . G01L 19/143; G01L 19/0061; G01L 19/148; G01L 19/146; G01L 19/0627;
(Continued)

(56) References Cited

U.S. PATENT DOCUMENTS 4,850,227 A * 7/1989 Luettgen ............. G01L 19/0038
73/708
5,747,694 A * 5/1998 Baba ................... G01L 19/0038
73/723

(Continued)

FOREIGN PATENT DOCUMENTS

CN    1497245 A    5/2004
CN    102119333 A    7/2011
(Continued)

OTHER PUBLICATIONS

International Search Report dated Jan. 1, 2017 of the corresponding International Application PCT/EP2016/074896 filed Oct. 17, 2016.
(Continued)

*Primary Examiner* — Nimeshkumar D Patel
*Assistant Examiner* — Gedeon M Kidanu
(74) *Attorney, Agent, or Firm* — Norton Rose Fulbright US LLP; Gerard Messina

(57) ABSTRACT

A device for detecting at least one property of a fluid medium, and a method for its production. The method includes a) providing at least one housing, the housing
(Continued)

having at least one electrical contact; introducing at least one sensor element for detecting the property into the housing; c) providing at least one pressure-pipe tube, the pressure-pipe tube including at least one contacting element; d) bringing the contacting element into contact with the sensor element in such a way that an electrical connection is established between the contacting element and the sensor element; and e) introducing at least one circuit substrate into the housing in such a way that the circuit substrate is electrically connected to the electrical contact of the housing and to the sensor element, the housing and the pressure-pipe tube being produced as separate components.

5 Claims, 2 Drawing Sheets

(58) Field of Classification Search
CPC . G01L 19/0084; G01L 19/0092; G01L 11/00; G01L 19/147; G01L 23/24
USPC .............. 73/514.01, 714, 754; 257/E21.002; 374/143
See application file for complete search history.

(56) References Cited

U.S. PATENT DOCUMENTS

| | | | | |
|---|---|---|---|---|
| 6,212,946 | B1* | 4/2001 | Naegele | G01K 1/26 73/114.31 |
| 6,272,913 | B1* | 8/2001 | Naegele | G01K 13/02 73/114.31 |
| 7,043,993 | B2* | 5/2006 | Hayashi | G01L 19/02 73/708 |
| 2004/0134282 | A1* | 7/2004 | Hayashi | G01L 19/02 73/708 |
| 2004/0264544 | A1* | 12/2004 | Fischer | G01K 7/16 374/208 |
| 2008/0034877 | A1* | 2/2008 | Fessele | G01L 19/069 73/700 |
| 2008/0047354 | A1* | 2/2008 | Otsuka | G01L 19/143 73/767 |
| 2009/0126694 | A1* | 5/2009 | Ritz | F02M 37/0011 123/495 |
| 2009/0314096 | A1* | 12/2009 | Colombo | G01L 19/0092 73/754 |
| 2011/0048137 | A1* | 3/2011 | Reinmuth | G01L 19/147 73/706 |
| 2011/0138924 | A1* | 6/2011 | Colombo | G01L 19/0038 73/756 |
| 2012/0304752 | A1* | 12/2012 | Krommenhoek | G01L 19/14 73/114.76 |
| 2014/0033824 | A1* | 2/2014 | Habibi | G01L 9/0073 73/724 |
| 2014/0202246 | A1 | 7/2014 | Fischer et al. | |
| 2014/0224028 | A1* | 8/2014 | Lux | G01L 19/148 73/728 |
| 2014/0341255 | A1* | 11/2014 | Kaiser | G01L 19/0084 374/143 |
| 2015/0192478 | A1* | 7/2015 | Rueth | G01K 1/14 374/143 |
| 2016/0099508 | A1* | 4/2016 | Ozaki | H01R 12/771 439/395 |
| 2016/0103034 | A1* | 4/2016 | Dutsky | G01L 19/143 73/756 |

FOREIGN PATENT DOCUMENTS

| | | |
|---|---|---|
| CN | 102124312 A | 7/2011 |
| CN | 102789887 A | 11/2012 |
| CN | 203629708 U | 6/2014 |
| CN | 104062066 A | 9/2014 |
| CN | 104124562 A | 10/2014 |
| DE | 19731420 A1 | 1/1999 |
| DE | 10223357 A1 | 12/2003 |
| DE | 102007033040 A1 | 1/2008 |
| DE | 102012223014 A1 | 6/2014 |
| EP | 2136193 A2 | 12/2009 |
| JP | 2000510956 A | 8/2000 |
| JP | 2001194255 A | 7/2001 |
| JP | 2004198394 A | 7/2004 |
| JP | 2004264243 A | 9/2004 |
| JP | 2013096805 A | 5/2013 |
| WO | 2014019906 A1 | 2/2014 |

OTHER PUBLICATIONS

Konrad Reif, Sensoren im Kraftfahrzeug (Automotive Sensors), 1st edition 2010, pp. 134-135, Image 3 and Image 4.

* cited by examiner

METHOD FOR PRODUCING A DEVICE FOR DETECTING AT LEAST ONE PROPERTY OF A FLUID MEDIUM IN A MEASURING CHAMBER

BACKGROUND INFORMATION

A multitude of sensors for detecting at least one property of a fluid medium in a measuring chamber are available in the related art. For example, sensors of this type are described in Konrad Reif: Sensoren im Kraftfahrzeug (Automotive Sensors), $1^{st}$ edition 2010, pages 134 through 135, Image 3 and Image 4.

One important application area for the use of such sensors is the automotive field. For example, the use of alternative fuels such as natural gas, CNG (compressed natural gas), ethanol or similar alternative fuels may require the use of adapted sensors in order to ascertain physical quantities such as the pressure and temperature in a manifold or in a fuel system. So-called medium-pressure sensors, for instance, allow for a measurement of a pressure and/or a temperature in a fuel system that is operated using CNG.

German Patent Application No. DE 10 2012 223014 A1 describes a device for detecting the pressure and the temperature of a medium, and also a method for producing such a device. The described device has a temperature sensor and a pressure sensor, which are situated in a shared housing, the housing additionally also including at least one measuring chamber. Via a pressure-pipe tube, the measuring chamber is connected to a chamber that holds the medium, the pressure sensor being disposed inside the measuring chamber. In addition, the temperature sensor has connection lines, and appropriate connection contacts for the contacting of the connection lines of the temperature sensor are provided in the housing. Moreover, in order to accommodate the temperature sensor, at least one conical channel, which terminates in the pressure-pipe tube, is disposed in the housing, the conical channel widening in the direction of the pressure-pipe tube. It is also provided that a sealing mass, which envelops the connection lines of the temperature sensor, is at least regionally introduced into the conical channel.

German Patent No. DE 10223357 A1 describes a device for a pressure measurement, which has a housing in which a substrate provided with a sensor element and electrical connection elements is disposed. The housing has a first housing chamber, which surrounds the sensor element and is connected to a first pressure channel of a first pressure connection; the housing also has a second housing chamber, which is sealed from the first housing chamber and surrounds at least the electrical connection elements, and the housing has a third housing chamber, which is sealed from the first housing chamber and the second housing chamber and is connected to a second pressure channel of a second pressure connection.

German Patent No. DE 19731420 A1 describes a device for detecting the pressure and the temperature in the manifold of an internal combustion engine. Disposed in a shared housing are a temperature sensor and a pressure sensor, which is fixed in place in a largely tension-free manner on a substrate together with an evaluation circuit. The housing includes at least two chambers which are separated from each other, one of these chambers forming a pressure chamber, which is connected to the manifold via a pressure-pipe tube, is sealed from the environment and accommodates the part of the substrate on which the pressure sensor is fixed in place, and whose other chamber is used to accommodate the remaining part of the substrate including the connection elements and to hold it in place. Seal-bonding connections, which decouple mechanical stresses, are provided for fastening the substrate and for sealing the pressure sensor.

Due to the constantly increasing demands, especially with regard to pressure, temperature, mechanical vibrations and/or media loading, and also due to increasing costs, an improved design that offers a simplified overall design may be generally desirable.

SUMMARY

An example device for detecting at least one property of a fluid medium in a measuring chamber, and also an example method for producing the device are provided.

The example method may include the method steps described below. For instance, the method steps may be carried out in the predefined sequence but some other sequence is possible as well. In addition, one or multiple method step(s) may be carried out simultaneously or in a temporally overlapping manner. Moreover, one, several, or all of the method step(s) is/are able to be carried out a single time or also repeatedly. Moreover, the present method may include still further method steps.

The present method encompasses the following steps:
a) Providing at least one housing, the housing having at least one electrical contact;
b) Introducing at least one sensor element for detecting the property into the housing;
c) Providing at least one pressure-pipe tube, the pressure-pipe tube including at least one contacting element;
d) Bringing the contacting element into contact with the sensor element in such a way that an electrical connection is established between the contacting element and the sensor element; and
e) Introducing at least one circuit substrate into the housing in such a way that the circuit substrate is electrically connected to the electrical contact of the housing and to the sensor element.

The housing and the pressure-pipe tube are produced as separate components.

Generally, a 'fluid medium' within the sense of the present invention is any material in a fluid, especially a gaseous state, that does not put up resistance to any type of slow shear. In particular, the fluid medium may be a gas and/or a fluid. In general, the fluid state of a material may be temperature- and/or pressure-dependent. The fluid medium may be present in the form of a pure substance or as a mixture of substances. The at least one property could be any physical and/or chemical and/or biological property of the fluid medium, and the at least one property may particularly be the pressure and/or the temperature of the fluid medium.

The term 'measuring chamber' in the sense of the present invention in particular refers to any chamber in or on an internal combustion engine, e.g., in a manifold of an internal combustion engine. More specifically, the measuring chamber may hold the fluid medium.

In principle, a 'sensor element' in the sense of the present invention may denote any element that detects at least one measured quantity and generates at least one signal, in particular a sensor signal, e.g., an electrical signal, from which a measured quantity is able to be inferred. The device may especially include an interface, which may be developed in the form of hardware and/or software, either completely or partially. More specifically, the sensor element may be designed to convert a measured quantity, e.g., a measured quantity selected from a physical, a chemical or a biological measured quantity, in particular of the pressure and/or the temperature of the medium, into an electrical signal, preferably into an electrical voltage and/or into an electrical current. In other words, depending on the pressure exerted on the sensor element and/or depending on a surrounding temperature, the sensor element is capable of generating a corresponding output signal, e.g., in the form of a voltage and/or a current. The signal may be digital or also analog. In general, multiple types of sensor elements may be provided, which need not necessarily be contacted or fixed in place using the same technique.

In particular, the sensor element may be a temperature sensor. The sensor element, especially the temperature sensor, may include at least one connection line. In principle, the term 'connection line' in the sense of the present invention denotes any electrical line that is made from an electrically conductive material and is designed to establish an electrical connection between two or more components. More specifically, the connection line may be produced from copper. Other electrically conductive materials are basically possible as well. For instance, the connection line may be a cable. The connection line may include at least one insulation sheath, which is produced from an electrically insulating material, in particular from an electrically insulating plastic material, and be developed to electrically insulate the connection line from an environment of the connection line. Prior to introducing the sensor element into the housing, the connection line of the sensor element may be bent.

In addition, the device may include at least one further sensor element, in particular a pressure sensor. The pressure sensor may preferably be mounted on the circuit substrate.

In principle, the term 'circuit substrate' in the sense of the present invention denotes any element that may be developed to carry and/or to include at least one actuation and/or at least one evaluation circuit, e.g., an electrical and/or electronic circuit. The circuit substrate may include a control and evaluation unit, which is designed to actuate the sensor. The control and evaluation unit may be an application-specific integrated circuit (ASIC), in particular.

The circuit substrate, for example, may be a ceramic circuit substrate. The circuit substrate may be fully or partially developed in the form of a circuit board, for instance, or include at least one circuit board. Other developments are possible as well. The circuit substrate may include at least one electronic component and/or at least one circuit trace. In addition, the circuit substrate may include at least one electrical contact surface, especially at least one contact pad. The electrical contact surface may be produced from an electrically conductive material, and its base surface may have any desired shape.

The circuit substrate may include at least one upper side and at least one lower side. In principle, the term 'lower side' of the circuit substrate denotes a surface of the circuit substrate that points toward the pressure-pipe tube. The term 'upper side' of the circuit substrate in the sense of the present invention basically denotes an oppositely situated surface of the upper side of the circuit substrate. For example, the pressure sensor may particularly be disposed on the lower side of the circuit substrate.

Generally, the term 'housing' in the sense of the present invention describes any form of an element that is designed to enclose components of the device either entirely or at least partially, and that is furthermore designed to protect these components from external influences such as mechanical stresses and/or moisture and/or further media. The housing may at least partially be produced from at least one plastic material. More specifically, the housing may be produced with the aid of at least one injection-molding process.

In addition, the device may include at least one pressure-pipe tube. In principle, the term 'pressure-pipe tube' in the sense of the present invention denotes any element that is designed to convey the fluid medium to the sensor element. For example, the pressure-pipe tube may be developed with rotational symmetry, e.g., in the form of a hollow cylinder. However, some other development is also possible. The pressure-pipe tube may include at least one channel. The channel may especially be a bore or an opening having any type of cross-sectional area, e.g., a cylindrical bore having a round or polygonal cross-section. The pressure-pipe tube may particularly project into the measuring chamber. The pressure-pipe tube may have at least one sealing element to provide sealing with respect to a wall of the measuring chamber, especially an O-ring. Alternatively or additionally, a geometry for a hose connection is possible.

As described earlier, the pressure-pipe tube and the housing are developed as separate components. The term 'separate' in the sense of the present invention is meant to express that the components are produced in separate methods. The components may subsequently be connected to each other, in particular in an integral fashion. Generally, the term 'integral fashion' in the framework of the present invention particularly describes a property of a connection between two or more components in which the components are held together by atomic forces and/or by molecular forces. For instance, the components may be connected to one another with the aid of at least one bonding method. Alternatively or additionally, the components may be connected to each other using form-locking. The term 'form-locking' in the framework of the present invention describes a property of a connection between two or more components in which the components are held together by engaging with one another. This makes it impossible for the components to separate from one another without a force transmission or also in a force transmission. A form-locked connection may particularly be a connection in which the at least two components are latched together. More specifically, one of the two components may include a receptacle, and the second component may include at least one complementary element which is designed to be accommodated and fixed in place in the receptacle in such a way that a movement of the complementary element in the receptacle is completely or at least partially reduced, and any shifting of the components relative to one another is entirely or at least partially reduced. A release of a connection between the receptacle and the complementary element is possible only by releasing a predefined mechanism.

Generally, the term 'electrical contact' in the sense of the present invention denotes any type of element that is produced from an electrically conductive material and is designed to establish an electrical contact between at least two components. The electrical contact may include at least one contact surface. In particular, the electrical contact may be entirely or partially made from copper and/or a copper alloy. In addition, the electrical contact may include at least one surface coating. Other materials are basically conceivable as well. In particular, the electrical contact may include at least one contact pin, especially at least one plug pin. The contact pin may preferably have an elongated form and at least one cross-section that is selected from the group made up of a round cross-section, a square cross-section, and a rectangular cross-section. Other specific developments are basically conceivable as well.

The electrical contact may especially be at least partially pressed into the housing. More specifically, the electrical contact may be pressed into the housing from an outer side of the housing. Alternatively, the housing is able to be produced with the aid of at least one injection-molding process, and the electrical contact may at least partially be embedded in the plastic material, especially at least partially be extrusion-coated with the plastic material. Moreover, the electrical contact may be introduced into the housing with the aid of at least one locking mechanism. Generally, the term 'locking mechanism' in the sense of the present invention describes any mechanical device that is developed to retain mobile elements in place and/or to prevent them from moving. The locking mechanism, for instance, may include at least one receptacle in the housing that is developed to accommodate the electrical contact. When the pressure-pipe tube is placed on the housing, the electrical contact may latch into place in the receptacle.

Generally, the term 'contacting element' denotes any element that is designed to establish an electrical connection between two or more components. The contacting element may particularly be produced from an electrically conductive material and/or be coated with an electrically conductive material. The contacting element may be connected to at least one of the components in an irreversible manner, in particular in an integral fashion. Alternatively or additionally, the contacting element is able to be connected to at least one of the components in a reversible manner, e.g., by a frictional connection. In principle, the term 'frictional connection' in the sense of the present invention denotes that a cohesion is entirely or at least partially ensured by at least one acting force, in particular by at least one pressure force and/or by at least one friction force. The circuit substrate may be connected to the electrical contact via the at least one contacting element. The contacting element is able to be fixed in place on the circuit substrate by soldering, bonding, or by a press-in technique, in particular.

The contacting element may especially be an insulation-displacement element for carrying out an insulation-displacement method. In principle, the term 'insulation-displacement method' denotes any method in which an electrical line is electrically contacted and mechanically fixed in place. In particular, the electrical line may include at least one insulation sheath, which could include at least one electrically insulating material. When the electrical line is brought into contact with the insulation-displacement element, the insulation-displacement element is first able to be mechanically held in place, especially by a clamping connection, whereupon the insulation sheath may be severed in such a way that an electrical connection is established between the electrical line and the insulation-displacement element.

The contact establishment between the contacting element and the sensor element may be achieved with the aid of the at least one connection line of the sensor element. More specifically, the contact between the contacting element and the sensor element may be established using at least the insulation-displacement method. A cut into the insulation sheath of the connection line in at least one location may be made while performing step d).

Prior to performing step d), at least one passivation of connection locations may be carried out. In principle, the term 'passivation' in the sense of the present invention denotes an application of at least one protective layer. The protective layer may particularly be developed for the purpose of preventing the corrosion of a material, either entirely or at least partially, or for at least slowing such a corrosion.

An adhesive, for example, is able to be introduced into the region of the contacting of the temperature sensor for the passivation. As an alternative, a separate chamber may be used for the passivation. This may particularly allow for an optical control prior to the positioning of the circuit substrate. Adhesives, preferably adhesives that exhibit an elastic behavior, especially silicon adhesives, or gels, especially gels featuring low mechanical stresses, and/or low compressive stresses, are able to be used for the passivation.

The introduction of the circuit substrate into the housing, in particular into a receptacle of the housing, may be carried out in such a way that the circuit substrate is fixed in place inside the housing, preferably using at least one integral connection technique, preferably using at least one chip technology, especially a chip technology selected from the group made up of gluing, bonding, and gelling. More specifically, the circuit substrate may be introduced into the housing in such a way that the underside of the circuit substrate is facing the pressure-pipe tube. In particular, the circuit substrate may be introduced into the housing in such a way that the pressure sensor faces the pressure-pipe tube. A side of the circuit substrate that lies opposite from the pressure sensor, in particular the topside of the circuit substrate, may be sealed from the measuring chamber, preferably by one or more of the following element(s): a sealing element, a sealing mass, or an adhesive. Usable are adhesives, preferably adhesives exhibiting an elastic behavior, especially silicon adhesives or gels, and especially gels that exhibit low mechanical stress and/or low compressive stress. In particular, it is possible to use the same material for the sealing of the pressure sensor as was used for the passivation of the temperature sensor.

In principle, the term 'spring contact' within the sense of the present invention refers to any element that exhibits electrically conductive properties and has an elastic restoring behavior such that the element yields under a load and returns to an original form of the element after the load has been removed. The spring contact may be elastically compressible and exert a pressure in the compressed state. In particular, the spring contact may be designed to store and transmit forces by changes in shape. In addition, the spring contact may be designed to store energy by a compression of the ends of the spring contact and to release the energy again, either entirely or at least partially, when the spring contact relaxes. The spring contact may preferably be produced from at least one electrically conductive material, in particular from steel, copper or a copper alloy, especially bronze or brass.

During the introduction of the circuit substrate, the spring contact may be pressed against the electrical contact of the housing and establish an electrical connection to the electrical contact.

The spring contact is able to be mounted on at least one surface of the circuit substrate, in particular in an integral fashion. The integral affixation may particularly include at least one process that is selected from the group that includes a soldering method, especially a reflow soldering method, and a bonding method. In principle, the term 'soldering method' denotes a thermal method for the integral joining of materials in which a liquid phase is created by melting and/or by a diffusion at boundary surfaces. The term 'reflow soldering method', also known as remelting soldering, denotes a conventional soft soldering method for soldering two or more components. In the reflow soldering method, a soft solder in the form of a solder paste may basically be applied to the component prior to mounting further components on the component, whereupon the soft solder may be fused. The bonding method may particularly include the use of at least one electrically conductive adhesive.

In addition, it is possible to attach at least one further component to the surface of the circuit substrate in an integral fashion. The further component may especially be selected from the group made up of the control and evaluation unit; and a component that is designed to ensure an electrical compatibility of the device, especially a capacitor.

The device for detecting at least one property of the fluid medium in a measuring chamber may particularly be produced according to an exemplary embodiment of the present method that was already described or that is still going to be described in the following text. The device includes at least one housing, at least one sensor element for detecting the property, at least one pressure-pipe tube for applying the fluid medium to the sensor element, and at least one circuit substrate. The housing has at least one electrical contact. The circuit substrate is electrically connected to the sensor element and to the electrical contact of the housing. The pressure-pipe tube and the housing are produced as separate components.

The provided device and the provided method for its production have numerous advantages over conventional devices and methods. Because the pressure-pipe tube and the housing are developed as separate components, it is basically possible to reproduce a greater and/or a simplified presentability of variants of the housing, in particular a plug, including different pressure connections and different plugs and/or plug angles. A modular design of pressure-pipe tubes, and thus a simple variant production, may be possible by designing the pressure-pipe tube and the housing as separate components. In addition, a construction of tools for the production of the housing and/or the pressure-pipe tube, in particular using an injection-molding method, is able to be simplified, in particular by reducing the number of slide elements of the tool for the final shaping of the housing and/or the pressure-pipe tube.

The contacting of the temperature sensor may be achieved through the use of an insulation-displacement element. The temperature sensor, in particular the connection line of the temperature sensor, may first be bent and then be placed inside the housing. The insulation-displacement element is able to be plugged into the pressure-pipe tube and contact the temperature sensor, in particular the connection line of the temperature sensor, especially by severing the insulation sheath of the connection line. With the aid of a cutoff trench, in particular, a passivation of the connection locations may subsequently be carried out. An electrical contacting of the circuit substrate, in particular the circuit board, may be realized with the aid of the spring contact in that the circuit substrate is introduced into the housing. A control of the electrical contacting can basically be carried out separately in each production step. A separate pre-assembly is also representable.

An electrical contacting of the sensor element, in particular a sensor module, with the housing is able to be achieved with the aid of the spring contact. The spring contact may be soldered or bonded to the circuit substrate, especially the circuit board or a ceramic. For a simple design, the circuit substrate may be bent in the upward direction. The components that are developed to ensure an electromagnetic compatibility, in particular the capacitors, may also be soldered or bonded to the circuit substrate. Additional components are able to be fixed in place on the circuit substrate, especially on the topside of the circuit substrate, using the reflow-soldering method. The circuit substrate, especially an underside of the circuit substrate, may preferably be introduced into the housing using at least one chip technique, e.g., gluing, bonding, or gelling. An adhesive, in particular, may be used to provide sealing between the measuring chamber and an interior of the housing.

The control and evaluation unit, especially the application-specific integrated circuit (ASIC), of the circuit substrate may particularly include sensitive contacting structures. A spatial separation of the control and evaluation unit from the sensor element may especially be accomplished with the aid of a sealing mass, especially a gel frame. In an effort to reduce the required surface area and to optimize a position of the components developed to ensure an electromagnetic compatibility, in particular the capacitors, the control and evaluation unit may be fixed in place on the circuit substrate, in particular the circuit board, using at least one flip-chip technology.

Because of the simple plug contacting and the simple routing of the electrical contacts, in particular the plug pins, it is basically possible to use pressed-in electrical contacts. In addition to pressed-in electrical contacts, the use of injected electrical contacts may be possible. A snap-in connection on the housing may be used as a curing aid, especially for a quick-release clip with respect to the spring contacts.

BRIEF DESCRIPTION OF THE DRAWINGS

Additional optional details and features of the present invention result from the description below of preferred exemplary embodiments, which are schematically shown in the figures.

DETAILED DESCRIPTION OF EXAMPLE EMBODIMENTS

Figure 1A:
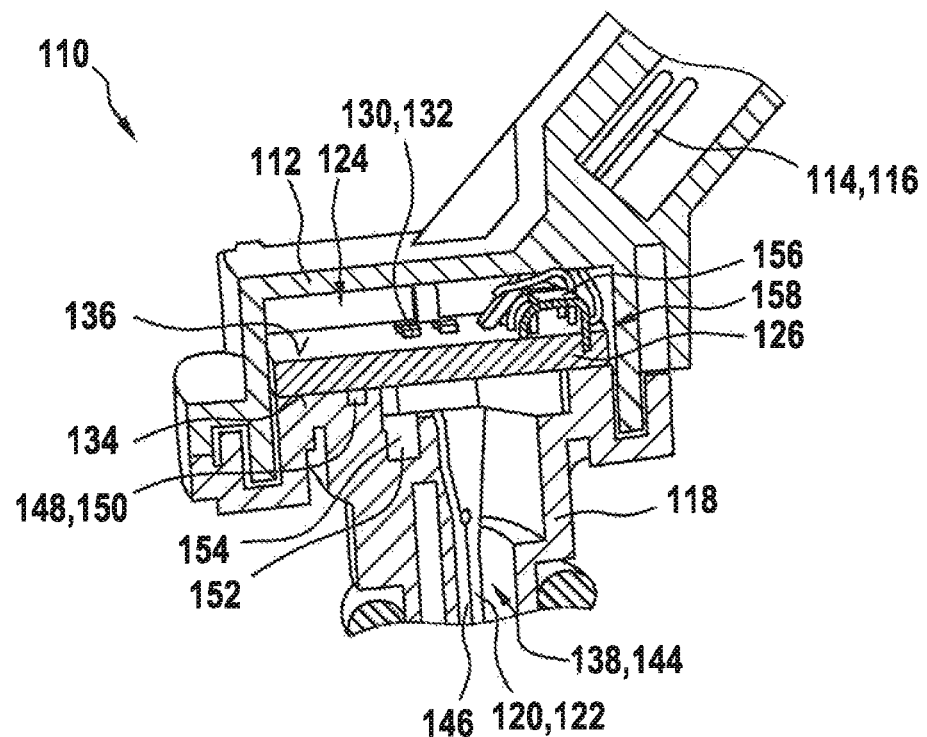
FIGS. 1A and 1B show an exemplary embodiment of a device for detecting at least one property of a medium according to the present invention, in two different sectional views.
Figure 1B:
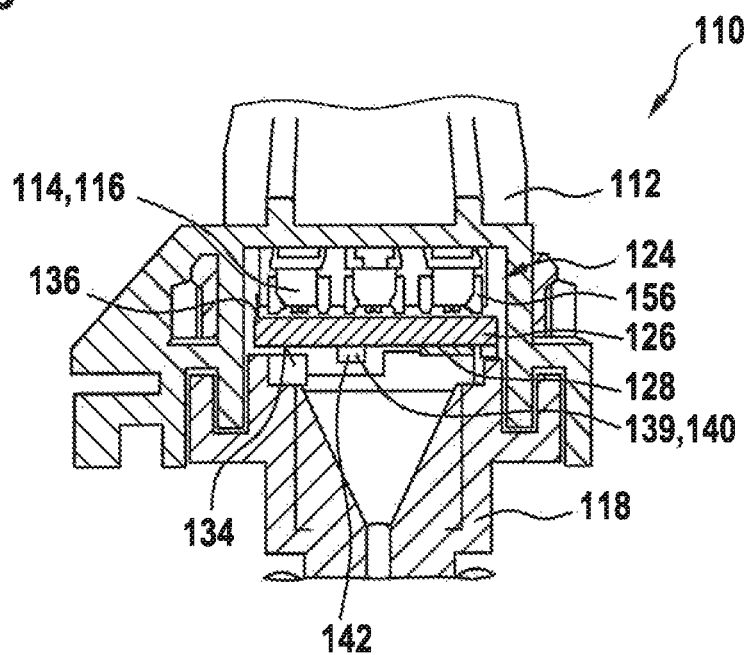

FIGS. 1A and 1B show an exemplary embodiment of a device 110 according to the present invention for detecting at least one property of a medium, in two different sectional views along a longitudinal extension direction of device 110.

Device 110 includes at least one housing 112. Housing 112 has at least one electrical contact 114. Electrical contact 114 may especially be a plug pin 116 and be produced from an electrically conductive material. More specifically, electrical contact 114 may have an elongated form.

In addition, device 110 includes at least one pressure-pipe tube 118. Pressure-pipe tube 118, for instance, may have a rotationally symmetrical design, e.g., be developed in the form of a hollow cylinder. Pressure-pipe tube 118 may include at least one channel 120. More specifically, channel 120 may be a bore 122 having a round or an oval cross-section. Pressure-pipe tube 118 and housing 112 are developed as separate components.

Moreover, housing 112 may have at least one receptacle 124, and at least one circuit substrate 126 is able to be accommodated in housing 112, in particular in receptacle 124 of housing 112.

Circuit substrate 126 especially may include at least one control and evaluation device 128. Furthermore, circuit substrate 126 may have at least one component 130 that is designed to ensure an electrical compatibility of device 110. More specifically, component 130 may be capacitors 132. Control and evaluation device 128 may especially be disposed on an underside 134 of circuit substrate 126. Capacitors 132 may be disposed on a topside 136 of circuit substrate 126, in particular.

In addition, circuit substrate 132 may have at least one spring contact 156, which is able to be attached to a topside 158 of circuit substrate 132, in particular.

Device 110 furthermore includes at least one sensor element 138 for detecting the property. More specifically, sensor element 138 may include at least one temperature sensor 144. Temperature sensor 144 may particularly be disposed in pressure-pipe tube 118. In addition, temperature sensor 144 may include at least one connection line 146. More specifically, connection line 146 may be disposed in channel 120 of pressure-pipe tube 118.

Furthermore, device 110 may have at least one further sensor element 139, especially a pressure sensor 140. Pressure sensor 140 may particularly be disposed on underside 134 of circuit substrate 126. More specifically, pressure sensor 140 may be sealed from an environment of device 110 with the aid of a gel frame 142.

In addition, device 110 may include at least one contacting element 148. Contacting element 148 may be an insulation-displacement element 150, in particular. Insulation-displacement element 150 may particularly be designed to cut into an insulation sheath of connection line 146 in at least one location. Contacting element 148 may be accommodated in pressure-pipe tube 118, in particular.

Moreover, device 110 may include at least one passivation 152 of connection points. Passivation 152 is able to be accommodated in at least one cutoff trench 154 of the pressure-pipe tube.

In addition, circuit substrate 126 may have at least one spring contact 156. Spring contact 156 particularly is able to be fastened to a topside 158 of circuit substrate 126.

Figure 2:
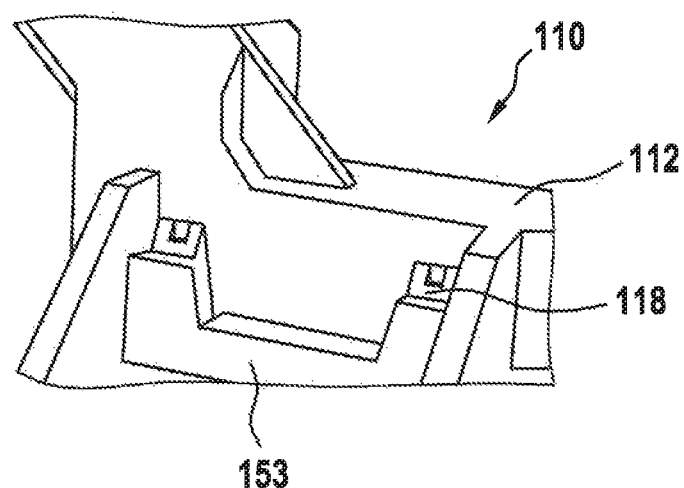
FIG. 2 shows a perspective representation of a snap-in connection.

FIG. 2 shows a perspective view of device 110 according to the present invention. Housing 112 and pressure-pipe tube 118 are able to be connected to each other in a form-locked manner. In particular, housing 112 and pressure-pipe tube 118 may be latched into each other. Housing 112 may include at least one receptacle 153, and pressure-pipe tube 118 may have at least one appendix 162 as a complementary element, which is designed to be accommodated and fixed in place inside receptacle 153.

Figure 3A:
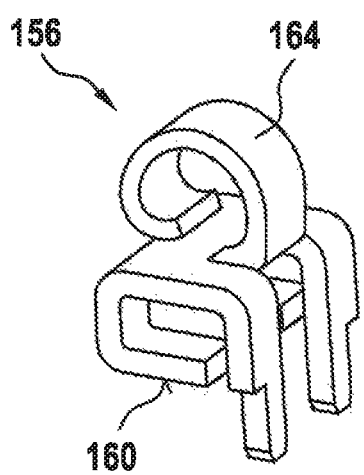
FIGS. 3A and 3B show two exemplary embodiments of a spring contact in a perspective view.
Figure 3B:
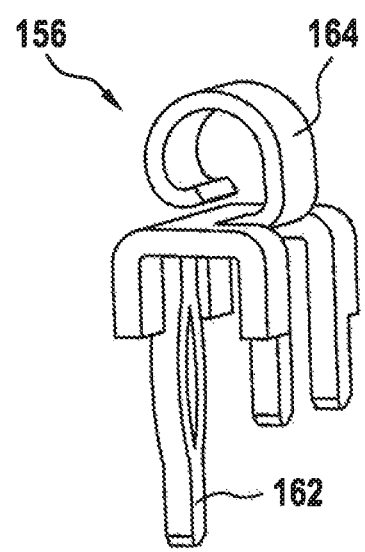

FIGS. 3A and 3B show two exemplary embodiments of a spring contact 156 in a perspective view. In the exemplary embodiment according to FIG. 3A, spring contact 156 may particularly be designed to be soldered or glued to circuit substrate 126, as illustrated in FIGS. 1A and 1B. Spring contact 156 may include at least one contact surface 160 for this purpose. In the exemplary embodiment according to FIG. 3B, spring contact 156 may especially be developed to be pressed into circuit substrate 126 as illustrated in FIGS. 1A and 1B. Toward this end, spring contact 156 may particularly have at least one elongated appendix 162. Appendix 163 could be a contact pin for a press-in connection into circuit substrate 126, in particular. In addition, spring contact 156 may include at least one spring element 164. Spring element 164 may especially be elastically compressible and designed to electrically contact electrical contact 114, as illustrated in FIGS. 1A and 1B.

What is claimed is:

1. A method for producing a device for detecting at least one property of a fluid medium in a measuring chamber, the method comprising:
    a) providing at least one housing, the housing having at least one electrical contact;
    b) providing at least one pressure-pipe tube configured to convey a fluid medium to a pressure sensor, wherein the at least one pressure-pipe tube includes a channel, the pressure-pipe tube having at least one contacting element;
    c) introducing at least one sensor element into the at least one pressure-pipe tube for detecting the property of the fluid medium into the housing, wherein the at least one sensor element includes at least one temperature sensor which has at least one connection line, the at least one connection line disposed in the channel;
    d) bringing, via at least one insulation-displacement method, the contacting element into contact with the at least one sensor element in such a way that an electrical connection is established between the contacting element and the at least one sensor element; and
    e) introducing at least one circuit substrate onto which the pressure sensor is applied, into the housing in such a way that the pressure sensor faces the at least one pressure-pipe tube and the circuit substrate is electrically connected to the electrical contact of the housing and, in that the contacting element is applied onto the circuit substrate by a press-in technique, to the at least one sensor element;
    wherein the housing and the pressure-pipe tube are produced as separate components,
    wherein at least one passivation of connection points in at least one cutoff trench of the pressure-pipe tube takes place prior to execution of step d).

2. The method as recited in claim 1, wherein the contacting of the contacting element to the at least one sensor element is performed with the aid of at least one connection line of the at least one sensor element, the connection line including at least one insulation sheath, and the contacting element having at least one insulation-displacement element, and during execution of step d), a cut is made into the insulation sheath in at least one location.

3. The method as recited in claim 1, wherein the circuit substrate has at least one electrical spring contact, the spring contact being pressed against the electrical contact of the housing when the circuit substrate is introduced into the housing, and producing an electrical connection to the electrical contact.

4. The method as recited in claim 1, wherein the housing and the pressure-pipe tube are connected to each other in an integral or form-locked manner.

5. The method as recited in claim 1, wherein the housing and the pressure-pipe tube are connected to each other with the aid of at least one connection technique, which is selected from the group made up of gluing and latching.

\* \* \* \* \*